US012566253B2

(12) United States Patent
Wang et al.

(10) Patent No.: US 12,566,253 B2
(45) Date of Patent: Mar. 3, 2026

(54) METHOD AND DEVICE FOR CONTROLLING LASER EMISSION, AND RELATED APPARATUS

(71) Applicant: SUTENG INNOVATION TECHNOLOGY CO., LTD., Shenzhen (CN)

(72) Inventors: Yongbo Wang, Shenzhen (CN); Shen Jiang, Shenzhen (CN); Yajun Du, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 1090 days.

(21) Appl. No.: 17/572,520

(22) Filed: Jan. 10, 2022

(65) Prior Publication Data

US 2022/0206116 A1      Jun. 30, 2022

Related U.S. Application Data

(63) Continuation of application No. PCT/CN2021/079156, filed on Mar. 4, 2021.

(30) Foreign Application Priority Data

Dec. 24, 2020    (WO) ................. PCT/CN2020/139048

(51) Int. Cl.
*G01S 7/484*      (2006.01)
*G01S 7/481*      (2006.01)
(Continued)

(52) U.S. Cl.
CPC ............. *G01S 7/484* (2013.01); *G01S 7/4815* (2013.01); *G01S 17/931* (2020.01); *H05B 47/115* (2020.01)

(58) Field of Classification Search
CPC ........ G01S 7/4815; G01S 7/41; G01S 7/4868; G01S 7/4804; G01S 7/497
See application file for complete search history.

(56) References Cited

U.S. PATENT DOCUMENTS 9,097,800 B1 *    8/2015  Zhu ........................ G01S 13/931
2009/0273770 A1    11/2009  Bauhahn et al.
(Continued)

FOREIGN PATENT DOCUMENTS

CA        3094023 A1 *  10/2019  ........... G01S 17/931
CN        106842223 A    6/2017
(Continued)

OTHER PUBLICATIONS

International Search Report issued in corresponding international application No. PCT/CN2021/079156, dated Sep. 24, 2021, 5 pages.
(Continued)

*Primary Examiner* — Maurice C Smith
(74) *Attorney, Agent, or Firm* — BAYES PLLC

(57) ABSTRACT

A method, a device, and an apparatus for controlling laser emission are provided. A secondary emergent laser is emitted at a first time of a detection period. A primary emergent laser emitted at a second time of the detection period is adjusted according to a first detection echo corresponding to the secondary emergent laser.

14 Claims, 5 Drawing Sheets

Emit a secondary emergent laser at a first time of a detection period.

S110

Adjust a primary emergent laser emitted at a second time of the detection period according to a first detection echo corresponding to the secondary emergent laser.

S120

(51) Int. Cl.
　　 *G01S 17/931* 　　(2020.01)
　　 *H05B 47/115* 　　(2020.01)

(56) References Cited

U.S. PATENT DOCUMENTS

| | | |
|---|---|---|
| 2018/0284244 A1 | 10/2018 | Russell et al. |
| 2020/0309910 A1 | 10/2020 | McCord et al. |

FOREIGN PATENT DOCUMENTS

| | | | | |
|---|---|---|---|---|
| CN | 109696691 A | | 4/2019 | |
| CN | 109884651 A | | 6/2019 | |
| CN | 110456372 A | | 11/2019 | |
| CN | 110612456 A | | 12/2019 | |
| CN | 112989913 A | * 6/2021 | ........... G06V 10/774 |
| DE | 102017005395 A1 | * 12/2018 | ............ G01S 7/4811 |
| DE | 102017221784 A1 | | 6/2019 | |
| EP | 1936400 A1 | | 6/2008 | |

OTHER PUBLICATIONS

European Search Report issued in related European Application No. EP 21908327.6, mailed Apr. 26, 2024, 11 pages.

\* cited by examiner

400

Secondary emitting module 410

Primary emitting module 420

500

Secondary emitting module 510

Primary emitting module 520

Processing module 530

Control module 540

METHOD AND DEVICE FOR CONTROLLING LASER EMISSION, AND RELATED APPARATUS

CROSS-REFERENCE TO RELATED APPLICATION

The present application is a continuation of International Application No. PCT/CN2021/079156, filed on Mar. 4, 2021, which claims priority to International Application No. PCT/CN2020/139048, filed on Dec. 24, 2020, the contents of both of which are incorporated herein by reference in its entirety.

TECHNICAL FIELD

An embodiment of the present disclosure relates to the field of LiDAR technologies, and more particularly, to a method and a device for controlling laser emission, and a related apparatus.

BACKGROUND

The LiDAR is a radar system that emits a laser beam to detect characteristics such as a position, a speed, or the like of a target. A working principle of the LiDAR is to transmit a transmitted signal toward the target, and then compare a received echo signal reflected from the target with the transmitted signal. After calculation, relevant information about the target, such as a distance, an azimuth, a height, a speed, a posture, even a shape and other parameters of the target, can be obtained, so that a detected object can be detected, tracked and identified.

At present, to ensure a sufficient detection distance, energy of the transmitted signal is generally as large as possible. The transmitted signal emitted by the LiDAR has a certain spread angle. A size of a light spot transmitted from a near field to a far field tends to be expanded. When a pedestrian (or an animal) appears in the near field, the transmitted signal that has not diffused is transmitted to human eyes, and most of the energy of the transmitted signal enters human eyes and causes damage.

SUMMARY

In view of the foregoing problems, an embodiment of the present disclosure provides a method, a device, and an apparatus for controlling laser emission, which are used to solve the technical problems of human eyes safety of a near field of LiDAR in the prior art.

Some embodiments of the present disclosure provide a method for controlling laser emission. The method may include emitting a secondary emergent laser at a first time of a detection period. A primary emergent laser emitted at a second time of the detection period may be adjusted according to a first detection echo corresponding to the secondary emergent laser.

Some embodiments of the present disclosure provide a device for controlling laser emission. The device may include a secondary emitting module that is configured to emit a secondary emergent laser at a first time of a detection period. The device may further include a primary emitting module that is configured to adjust a primary emergent laser emitted at a second time of the detection period according to a first detection echo corresponding to the secondary emergent laser.

Some embodiments of the present disclosure may provide a method for controlling laser emission. The method may include emitting a secondary emergent laser in a secondary analysis region of a current detection period; determining whether a detection result of the secondary analysis region includes a target; and in response to determining that the detection result includes the target, adjusting a primary emergent laser in a primary analysis region to be an adjusted power. The adjusted power being less than a preset power.

Some embodiments of the present disclosure may provide a device for controlling laser emission. The device may include: a secondary emitting module, configured to emit a secondary emergent laser; a primary emitting module, configured to emit a primary emergent laser; and a processing module. The processing module may be configured to: generate a secondary control signal and send the secondary control signal to a control module; obtain a detection result of a secondary analysis region according to the secondary emergent laser and a first detection echo corresponding to the secondary emergent laser; control to store the detection result in a storage module in a time order; determine whether the detection result of the secondary analysis region includes a target; in response to determining that the detection result includes the target, generate a primary control signal and send the primary control signal to the control module; and in response to determining that the detection result does not include the target, acquire the detection result of the secondary analysis region of at least one previous detection period from the storage module, determine whether the detection result of the secondary analysis region of the at least one previous detection period includes the target, generate the primary control signal according to a determining result and send the primary control signal to the control module.

In some embodiments of the present disclosure, the secondary emergent laser may be emitted at the first time in the detection period, and the primary emergent laser emitted at the second time may be adjusted according to a situation of the first detection echo returned by the secondary emergent laser. Before start of each detection, the LiDAR cannot predict a situation of a detected object, including its existence, distance, position, speed, or the like, so it is impossible to adjust emission of the emergent laser in advance. The secondary emergent laser with a lower power may be first emitted to obtain a situation of the detected object in a near field region. Even if a pedestrian is positioned in the near field region, a human eye safety threshold may not be exceeded. Then, the situation of the detected object in the near field region may be obtained according to the first detection echo. Through this manner, the primary emergent laser may be adjusted. A detection ability of the LiDAR may not be affected while ensuring the human eye safety.

The foregoing descriptions are only brief descriptions of the technical solutions in the embodiments of the present disclosure. To understand the technical means in the embodiments of the present disclosure more clearly so that the technical means can be carried out according to the content of the specification. To make the foregoing and other objectives, features and advantages of the embodiments of the present disclosure more apparent and understandable, specific implementations of the present disclosure are illustrated particularly below.

BRIEF DESCRIPTION OF THE DIAGRAMS

The drawings are only used to illustrate some embodiments of the present disclosure and are not considered as the limitation to the present disclosure. Modifications and variations based on the drawings by a person skilled in the pertinent art without extra work may still fall into scope of the present disclosure. In addition, throughout the drawings, the same reference signs are used to represent the same component. In the drawings.

DESCRIPTION OF THE INVENTION

Figure 1:
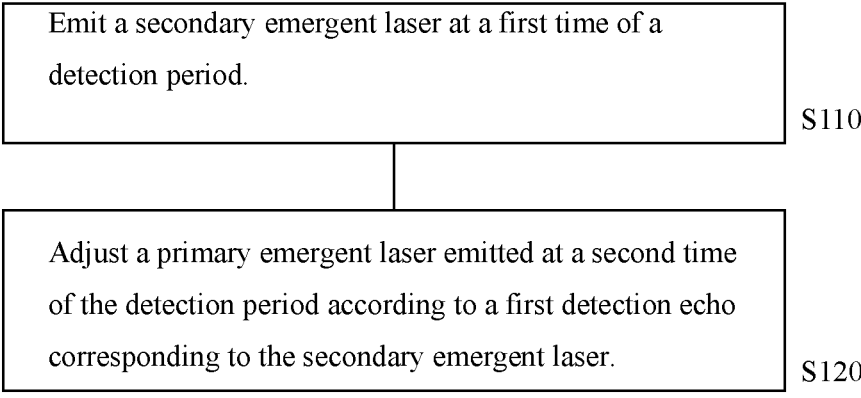
FIG. 1 shows a flowchart of a method for controlling laser emission according to some embodiments of the present disclosure.

The following describes some exemplary embodiments of the present disclosure in a more detailed manner with reference to the drawings. Although the drawings show the exemplary embodiments of the present disclosure, it should be understood that the present disclosure can be implemented in various forms and should not be limited to the embodiments described herein.

To ensure a detection distance of a LiDAR, it is required to increase energy of an emergent laser as much as possible. However, laser with higher energy can cause damage to eyes and skin, especially for the eyes. The laser can be focused on a retina by the eyes, causing damage to the retina and even severe burns to the retina. The emergent laser emitted by the LiDAR has a certain spread angle. A size of a light spot transmitted from a near field to a far field tends to be expanded. When the emergent laser reaches the far field region, the emergent laser travels a longer distance in space, and the energy is lost. In addition, the emergent laser in the far field region has a larger size of the light spot, which ensures that only a part of light enters the eyes and have less energy. In the far field region, eye safety can thus be guaranteed. In contrast to this situation, in the near field region, the loss of the emergent laser is less, and the light spot is converged, which easily cause issues regarding human eye safety.

In addition, a detection ability of the LiDAR is affected, or the detection even fails due to a leading light. The leading light of the LiDAR is usually generated because the emergent laser is scattered on an inner wall of an internal structure or reflected on a surface of an optical element. For example, the emergent laser is scattered on a side wall of a lens barrel of an emitting mirror group; the emergent laser is reflected on a surface of a beam splitter; the emergent laser is reflected on a base of a galvanometer, and so on. Since the leading light propagates inside the LiDAR and a propagation distance is short, the leading light reaches a receiving module earlier than a normal detection echo. The receiving module responds to the leading light first and then outputs a detection signal based on the leading light. After a receiver of the receiving module performs a valid photon count, the receiver does not respond to a new signal for a period of time until the receiving module returns to the normal working state. This period of time is called dead time. However, the detection echo in the near field region is returned relatively fast, and the receiving module is still in the dead time and cannot respond effectively, resulting in a detection blind zone in the near field region. As for the LiDAR of a coaxial system, a transmitting optical path and a receiving optical path are overlapped in space, so the leading light generated by the transmitting laser on the transmitting optical path can always enter the receiving optical path. Therefore, the LiDAR of the coaxial system cannot avoid an influence of the leading light.

For the LiDAR that can achieve long-distance ranging, a high-sensitivity detector, such as APD, SiPM, or the like, is used. A large response current generated by the receiving module to the leading light increases a random noise in a subsequent receiving process, thereby affecting a ranging capability of the LiDAR.

Based on the above-mentioned human eye safety in the near field region, FIG. 1 shows a flowchart of a method for controlling laser emission according to some embodiments of the present disclosure. The method can be executed by a LiDAR. The LiDAR can include a laser device and a device for controlling the laser emission. As shown in FIG. 1, the method may include the following steps:

Step 110: emitting a secondary emergent laser at a first time of a detection period.

The LiDAR works periodically with multiple detection periods and completes at least one detection in each of the detection periods. Accordingly, one corresponding transmission and reception, and detection data may be obtained. During the detection period, one detection can be defined as an analysis region (for example, a point cloud processing process). In some embodiments of the present disclosure, the secondary emergent laser may be emitted at the first time of each detection period. The secondary emergent laser has a relatively small power and can only detect the near field region. In addition, even if the secondary emergent laser is irradiated to human eyes in the near field region, a damage to the human eyes can also be reduced. For instance, the secondary emergent laser may be emitted in a secondary analysis region of the detection period. In an embodiment of the present disclosure, a power of the secondary emergent laser is not specifically limited, and the person skilled in the art can set the power according to specific usage requirements. In some instances, the power of the secondary emergent laser may be less than or equal to a safety threshold of the human eyes. Through this way, the power of the secondary emergent laser can meet requirements of the human eye safety. Even if the secondary emergent laser irradiates to the human eyes in the near field region, the secondary emergent laser does not cause the damage to the human eyes. The safety threshold of the human eyes can be obtained by querying a relevant laser safety protection standard.

The power of the secondary emergent laser can also be determined according to the maximum distance of the near field region. When other conditions are set the same, a ranging ability of the LiDAR is positively correlated with the power of the emergent laser. The greater the power of the emergent laser, the better the ranging ability of the LiDAR. As described above, it can be seen that the human eye safety is more of a concern in the near field region of the field of view of the LiDAR, so the detection distance corresponding to the secondary emergent laser can at least cover the near field region. In some embodiments, a detection distance corresponding to the power P' of the secondary emergent laser may be equal to the maximum distance of the near field region. It should be noted that when the power P' of the secondary emergent laser is greater than the safety threshold of the human eyes, considering that the secondary emergent laser is to detect the near field region under the premise of ensuring the human eye safety, the power P' of the secondary emergent laser may be decreased and may be equal to the safety threshold of the human eyes. When the power P' of the secondary emergent laser is less than or equal to the safety threshold of the human eyes, the power P' may be maintained unchanged to meet application requirements and reduce a power consumption of the LiDAR.

Compared with a direct emission of the emergent laser at a preset power to meet detection requirements of the LiDAR, the secondary emergent laser with a lower power is emitted first, which can effectively determine whether a detected object is provided in the near field region, and also ensure the human eye safety in the near field region. In addition, when the detected object is provided in the near field region, the power of the emergent laser at a subsequent time can also be adjusted according to a detection situation of the secondary emergent laser.

Step 120: adjusting a primary emergent laser emitted at a second time of the detection period according to a first detection echo corresponding to the secondary emergent laser.

Some embodiment of the present disclosure may determine the power of the primary emergent laser emitted at the second time according to a situation of the first detection echo of the secondary emergent laser. For example, the detection period may be divided into a corresponding secondary analysis region and a corresponding primary analysis region, and a power of the primary emergent laser in the primary analysis region may be determined according to a detection result of the secondary analysis region. On the one hand, when the secondary emergent laser detects an object in the near field region, the power of the primary emergent laser can be reduced. Through this way, even if the primary emergent laser irradiates a target object, which is a pedestrian, in the near field region, the safety requirements can also be met. In addition, under the premise that the detected object is provided in the near field region, detection requirements of the LiDAR in the far field region corresponding to an azimuth may be also reduced accordingly. Reducing the power of the primary emergent laser does not significantly affect the overall detection ability of the LiDAR. On the other hand, when the secondary emergent laser does not detect the detected object in the near field region, it is considered that no detected object is provided in the near field region, and the primary emergent laser may be emitted at a preset power to meet the detection requirements, thereby ensuring the detection ability of the LiDAR.

In some embodiments of the present disclosure, each cycle of the detection period includes at least the secondary emergent laser emitted at the first time and the primary emergent laser emitted at the second time. As mentioned above, at least one detection is completed in the detection period. In other embodiments of the present disclosure, two detections may be completed in the detection period, respectively in the secondary analysis region and the primary analysis region. The secondary emergent laser may be emitted at the first time in the secondary analysis region, and the primary emergent laser may be emitted at the second time in the primary analysis region. A time interval between the first time and the second time may be greater than or equal to a traveling time of the longest detection distance corresponding to the secondary emergent laser. Before the second time, a corresponding first detection echo within a range of the secondary emergent laser may be received by the LiDAR. Therefore, it can be avoided that when the primary detection echo is not received by the LiDAR, the primary emergent laser continues to be emitted, causing a crosstalk of the secondary emergent laser and the primary emergent laser, thereby affecting the accuracy of the LiDAR.

In some embodiments, the step of adjusting the primary emergent laser emitted according to the first detection echo corresponding to the secondary emergent laser may further include the following steps:

Step 1201: in response to the first detection echo corresponding to the secondary emergent laser being not received for a period of time, setting the power of the primary emergent laser emitted at the second time of the detection period to be the preset power.

The preset power may be a normal transmission power of the LiDAR that meets the ranging capability and detection performance, and the preset power may be greater than a power of the secondary emergent laser. For example, a ranging capability defined by the LiDAR may be 200 m. According to a system configuration of the LiDAR, the transmission power that meets the detection requirements can be determined, and the transmission power may be the preset power. The first detection echo corresponding to the secondary emergent laser refers to an echo laser that returns after the secondary emergent laser emitted outward is reflected by an object in the field of view.

If the first detection echo corresponding to the secondary emergent laser is not received for the period of time, indicating that no detected object may be positioned in the near field region. Hence, it is considered that no safety issue that damages the eyes of a human will occur on the object in the near field region. The primary emergent laser with the preset power may be emitted at the second time. The entire field of view of the LiDAR may be detected, thereby ensuring the detection ability of the LiDAR.

Step 1202: in response to the first detection echo corresponding to the secondary emergent laser being received, setting the power of the primary emergent laser emitted at the second time of the detection period to be the adjusted power, where the adjusted power may be the preset power.

When the first detection echo corresponding to the secondary emergent laser is received, it indicates that the target object may be positioned in the near field region. A type of the target object may be a pedestrian. If the primary emergent laser is continuously emitted at the preset power at the second time, the primary emergent laser may cause injury to the pedestrian in the near field region. The power of the primary emergent laser emitted at the second time may be reduced to the adjusted power. By reducing the power of the primary emergent laser to the preset power, the primary emergent laser is no longer emitted at the preset power, thereby reducing the energy of the emergent laser in the near field region, and effectively reducing or avoiding the damage to the human eyes in the near field region.

A plurality of ways may be provided to adjust the power. The power of the primary emergent laser can be adjusted to a certain fixed power value upon receiving the first detection echo. For example, when the first detection echo is received, a signal may be sent to the device for controlling the laser emission, thereby controlling the power of the primary emergent laser emitted by the laser device to be a fixed power value. The adjusted power may be set to the fixed power value, which can automatically and quickly adjust the primary emergent laser of the laser device and can effectively guarantee a working efficiency of the laser device while ensuring the human eye safety. The power of the primary emergent laser can also be adjusted to different power values according to the analysis result of the first detection echo. For example, the analysis result may be obtained according to the first detection echo, and a processor may send a control signal to a laser emitting device according to the analysis result to control the power of the primary emergent laser emitted by the laser device to be a specific power value. By adjusting the power of the primary emergent laser to different power values according to the analysis result of the first detection echo, the power adjustment of the primary emergent laser may be more reasonable, which can ensure the human eye safety while ensuring the detection ability of LiDAR to the greatest extent.

Whether the LiDAR receives the first detection echo corresponding to the secondary emergent laser may be used as a basis for determining whether the detected object is positioned in the near field region. If the first detection echo is not received for the period of time, it is considered that no detected object is positioned in the near field region. At this point, the human eye safety does not need to be considered. The laser device can normally emit the emergent laser with a high power for long-distance detection. The power of the primary emergent laser may be the preset power. If the first detection echo is received, it is considered that the detected object is positioned in the near field region. At this point, the LiDAR may not deeply distinguish a type of detected object detected before the primary emergent laser is emitted, and it is uniformly considered that the emergent laser may affect the detected object in the near field region. The power of the primary emergent laser may be reduced to the adjusted power. Since both the secondary emergent laser and the primary emergent laser are emitted in the same detection period with a short time interval, the foregoing method can rapidly adjust the primary emergent laser emitted at the second time, so that the power of the primary emergent laser can accurately and rapidly respond to the current situation.

In addition, the power of the primary emergent laser is relatively high, and the leading light generated after reflection on each optical surface of the LiDAR is also relatively strong. The leading light enters the receiver of the LiDAR, causing the receiver to saturate. The receiver needs to pass a dead time before the receiver can resume a normal operation. The dead time of the receiver caused by the leading light causes the receiver to be unable to receive a normal detection echo returned from the near field region, resulting in a blind zone of the near field of the LiDAR. The power of the secondary emergent laser in this embodiment is low, and the generated leading light is also less. By lowering a gain of the receiver, saturation can be avoided, and the dead time can be prevented. With a cooperation of the secondary emergent laser and the primary emergent laser, the blind zone of the near field of the LiDAR can be eliminated, thereby achieving a full coverage of the field of view. In each detection period, the detection data obtained by an integration period of the secondary emergent laser and the detection data obtained by an integration period of the primary emergent laser are spliced and integrated to obtain one frame of complete data. For example, the integration period of the secondary emergent laser can obtain detection data in the near field region of approximately 0 m to 5 m, and the integration period of the primary emergent laser can obtain detection data of approximately 5 m to approximately 200 m. The two sets of detection data are spliced and integrated in distance to obtain the complete data.

In some embodiments, the secondary emergent laser may be emitted at the first time in the detection period, and the primary emergent laser emitted at the second time may be adjusted according to the situation of the first detection echo returned by the secondary emergent laser. Before start of each detection, the LiDAR cannot predict a situation of the detected object, including its existence, distance, position, speed, or the like, so it is impossible to adjust emission of the emergent laser in advance. The secondary emergent laser with a lower power may be first emitted to obtain the detected object in the near field region. Even if a pedestrian is positioned in the near field region, the eye safety threshold may not be exceeded. Then, the situation of the detected object in the near field region may be obtained according to the first detection echo. Based on this, the primary emergent laser may be adjusted. The detection ability of the LiDAR may not be affected while ensuring the human eye safety.

Figure 2:
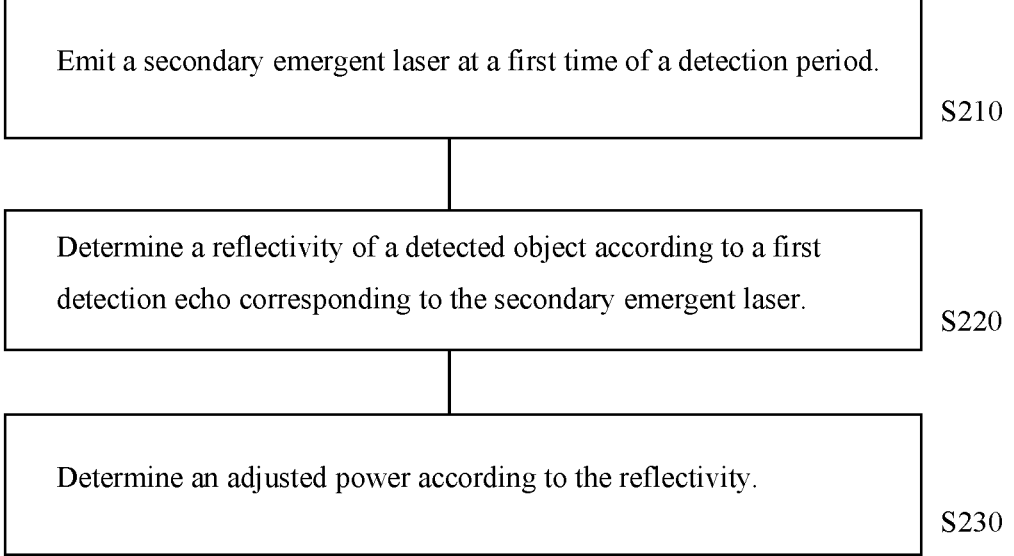
FIG. 2 shows a flowchart of another method for controlling laser emission according to some embodiments of the present disclosure.

FIG. 2 shows a flowchart of another method for controlling laser emission according to some embodiments of the present disclosure. The method can be executed by a LiDAR. As shown in FIG. 2, the method may include the following steps:

Step 210: emitting a secondary emergent laser at a first time of a detection period.

The above disclosure describes some embodiments in regard to step 110. The configurations, processes, settings, and/or operations of step 210 may be identical or similar to step 110 as described above. For ease of the description, step 210 is not described again herein.

Step 220: determining a reflectivity of the detected object according to the first detection echo corresponding to the secondary emergent laser.

The secondary emergent laser and the corresponding first detection echo may be one complete transmission and reception detection process. According to an emission time (i.e., a first time) of the secondary emergent laser and a reception time of the first detection echo, a traveling time $\Delta T1$ can be obtained, and then a traveling distance can be calculated. Through the same way, a power attenuation $\Delta P_1$ can be calculated according to a transmitting power of the secondary emergent laser and a receiving power of the first detection echo. A power loss can be obtained according to the traveling distance, a system efficiency of the LiDAR, or the like. Combined with an azimuth angle and the power attenuation $\Delta P_1$ or the like of the detection process, the reflectivity of the detected object may be obtained.

The reflectivity of different detected objects may be different, mainly depending on the nature of the object itself (such as surface conditions) and an angle of incidence. For example, a pedestrian reflectivity, a car reflectivity, and a road reflectivity are all different. Therefore, calculating the reflectivity of the detected object based on the secondary emergent laser and the first detection echo can determine a coarse classification type of the detected object, such as a pedestrian, a vehicle, a road, a green belt, and a streetlight, or the like.

Step 230: determining an adjusted power according to the reflectivity.

It can be seen from the foregoing that the coarse classification type of the detected object can be determined according to the reflectivity. The adjusted power of the primary emergent laser may be determined according to the coarse classification type of the detected object, so that the adjusted power may be set more reasonably. When the type of the detected object is determined as a pedestrian, the power of the primary emergent laser can be significantly reduced to ensure a human eye safety; When the type of detected objects is determined as other objects rather than the pedestrian, the power of the primary emergent laser can be appropriately reduced, which not only reduces the impact on the object in the near field region, but also ensures the detection ability of the LiDAR.

When the reflectivity is within a preset reflectivity range, the level of the adjusted power may be determined to be a first power. When the reflectivity is not within the preset reflectivity range, the level of the adjusted power may be determined to be a second power. The first power may be less than the second power. The preset reflectivity range may be the pedestrian reflectivity range.

The preset reflectivity range may be a reflectivity range corresponding to the pedestrian. The reflectivity range of the pedestrian can be obtained through experience or by querying relevant data. When the reflectivity of the detected object is within the preset reflectivity range, the detected object is the pedestrian, or a probability that the detected object is the pedestrian is high. To ensure the human eye safety, the adjusted power may be significantly reduced to the first power. When the reflectivity of the detected object is not within the preset reflectivity range, the detected object may be not the pedestrian, or the probability that the detected object may be the pedestrian is low. The adjusted power may be adjusted again to the second power to reduce an impact on the object in the near field region. In addition, the second power can be greater than the first power, thereby ensuring the detection ability of the LiDAR as much as possible. In some embodiments, when the reflectivity of the detected object is within the preset reflectivity range of the pedestrian, the adjusted power of the primary emergent laser may be reduced to 10% of the preset power. When the reflectivity of the detected object is not within the preset reflectivity range of the pedestrian, the adjusted power of the primary emergent laser may be reduced to 50% of the preset power.

In some embodiment of the present disclosure, the reflectivity of the detected object may be obtained by analyzing the first detection echo, and the reflectivity of the detected object may be compared with the preset reflectivity range to determine whether the detected object is the pedestrian, thereby adjusting the adjusted power of the primary emergent laser more accurately. Therefore, the LiDAR may perform long-distance detection as efficiently as possible while ensuring the human eye safety.

Figure 3:
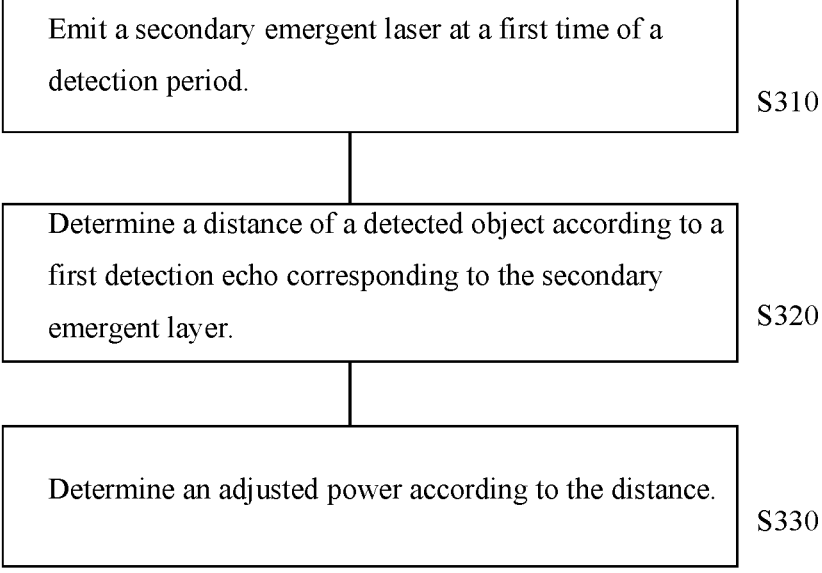
FIG. 3 shows a flowchart of still another method for controlling laser emission according to some embodiments of the present disclosure.

FIG. 3 shows a flowchart of still another method for controlling laser emission according to some embodiments of the present disclosure. The method can be executed by a LiDAR apparatus. As shown in FIG. 3, the method may include the following steps:

Step 310: emitting a secondary emergent laser at a first time of a detection period.

The above disclosure describes some embodiments in regard to step 110. The configurations, processes, settings, and/or operations of step 210 may be identical or similar to step 110 as described above. For ease of the description, step 210 is not described again herein.

Step 320: determining a distance of a detected object according to a first detection echo corresponding to the secondary emergent laser.

As mentioned above, the secondary emergent laser and the corresponding first detection echo may be one complete transmission and reception detection process. As described above, according to the emission time (i.e., the first time) of the secondary emergent laser and the reception time of the first detection echo, the traveling time $\Delta T_1$ can be obtained, and then a traveling distance can be calculated to obtain a distance between the detected object and the LiDAR.

Each of the detection periods may correspond to a different azimuth in the field of view, and the secondary emergent laser and the first detection echo can detect an object at different distances.

Step 330: determining the adjusted power according to the distance.

From the foregoing, it can be seen that the closer a distance of a detected object is to the LiDAR, the smaller the loss of the emergent laser, the more convergent a light spot, and the more likely the human eye safety is affected. An adjusted power of the primary emergent laser may be determined according to the distance of the detected object, so that the adjusted power may be set more reasonably with a high utilization rate. When the distance of the detected object is too small, the power of the primary emergent laser may be reduced more. When the distance of the detection object is in the near field region, but the distance is not too small, the power of the primary emergent laser may have a relatively low decrease.

When the distance is within a preset distance range, the level of the adjusted power may be determined to be a third power. When the distance is not within the preset distance range, the level of the adjusted power may be determined to be a fourth power. The third power may be less than the fourth power.

The preset distance range can be a distance range where the distance is less than a certain distance threshold $L_0$. The distance threshold $L_0$ can be obtained via experience or can be set manually. When the distance of the detected object is greater than or equal to the distance threshold $L_0$, the distance may be not within the preset distance range, and the adjusted power may be reduced to the fourth power. When the distance of the detected object is less than the distance threshold $L_0$, the distance may be within the preset distance range. The adjusted power may be reduced to the third power. This facilitates the energy distribution of the LiDAR emergent laser to be more reasonable. The smaller the distance, the smaller the energy, and the more the energy is in line with the requirements of the human eye safety. In some embodiments, the distance threshold $L_0$ may be equal to approximately 3 m. The near field region may be 0 m to 5 m. When the distance of the detected object is approximately 2 m, the distance may be less than $L_0$ and may be within the preset distance range. The adjusted power of the primary emergent laser may be reduced to 10% of a preset power. When the distance of the detected object is approximately 4 m, the distance may be greater than $L_0$ and may not be within the preset distance range. The adjusted power of the primary emergent laser may be reduced to 30% of the preset power.

Further, from the foregoing, it can be seen that the closer the object to be detected is to the LiDAR, the smaller the adjusted power of the corresponding primary emergent laser. Based on this, a relational expression between the distance of the detected object and the adjusted power can be obtained. After the distance of the detected object is obtained, the distance may be fed into the relational expression to obtain the adjusted power of the primary emergent laser. The relational expression can be obtained by data fitting after basic data are obtained via a plurality of tests. The relational expression obtained after fitting can be pre-stored in the LiDAR.

In practical applications, each distance value corresponds to one adjusted power, which increases the difficulty in drive control of a laser device. In some embodiments, the near field region may be divided into a plurality of preset distance ranges. The preset distance range covering a nearer region corresponds to a smaller adjusted power value. The preset distance range covering the farther region may correspond to a larger adjusted power value. In some instances, the near field region may be 0 m to approximately 5 m, and three preset distance ranges can be set, which may include a first preset distance ranging from 0 m to 1 m, a second preset distance ranging from 1 m to 3 m, and a third preset distance ranging 3 m to 5 m, respectively. When the distance of the detected object is within the first preset distance range (i.e., 0 m to 1 m), the adjusted power of the primary emergent laser may be 30% of the preset power. When the distance of the detected object is within the second preset distance range (i.e., 1 m to 3 m), the adjusted power of the primary emergent laser may be 50% of the preset power. When the distance of the detected object is within the third preset distance range (i.e., 3 m to 5 m), the adjusted power of the primary emergent laser may be 70% of the preset power.

In some embodiments of the present disclosure, the distance of the detected object may be obtained by analyzing the first detection echo. A value of the adjusted power may be determined according to the distance of the detected object. The closer the near-field region is, the smaller the adjusted power of the primary emergent laser may be, the more scientific the power may be set, and the more reasonable the energy distribution of the primary emergent laser, which ensures the human eye safety in the near field region and improves the energy consumption efficiency of the LiDAR.

Figures 4, 5:
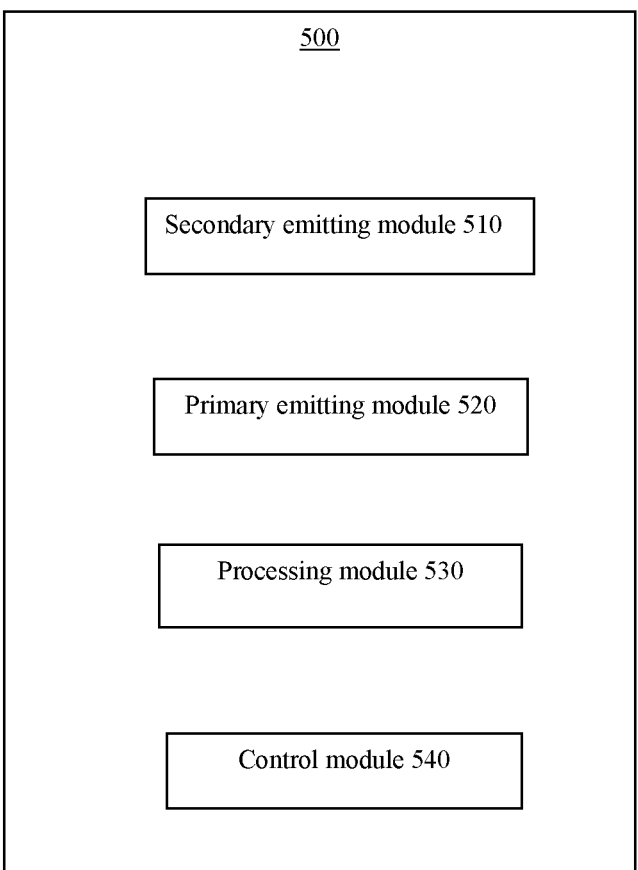
FIG. 4 shows a schematic structural diagram of a device for controlling laser emission according to some embodiments of the present disclosure.
FIG. 5 shows a schematic structural diagram of another device for controlling laser emission according to some embodiments of the present disclosure.

FIG. 4 shows a schematic structural diagram of an embodiment of a device for controlling laser emission according to some embodiments of the present disclosure. As shown in FIG. 4, the device 400 may include a secondary emitting module 410 and a primary emitting module 420.

The secondary sending module 410 may be configured to emit the secondary emergent laser at the first time of the detection period.

The primary emitting module 420 may be configured to adjust the primary emergent laser emitted at the second time of the detection period according to a first detection echo corresponding to the secondary emergent laser.

In some embodiments of the present disclosure, the primary emitting module 410 and the secondary emitting module 420 can be the same emitting module.

A specific working process of a laser ranging device 400 that is beneficial to human eye safety according to the embodiment of the present disclosure is the same as the specific steps of the foregoing method for controlling the laser emission, which is not repeated here.

In the embodiment of the present disclosure, the secondary emergent laser is emitted first during the detection period. When the detected object is detected, energy of the primary emergent laser is reduced and the primary emergent laser is emitted, thereby avoiding a strong laser from irradiating human eyes and causing damage to the human eyes. The secondary emergent laser and the primary emergent laser are in one detection period, which ensures the working efficiency of the LiDAR while ensuring the human eye safety.

Further, owing to the arrangement of the secondary emergent laser and the primary emergent laser in one detection period, a near field distance and a far field distance can be measured each time, thereby splicing a LiDAR ranging distance.

FIG. 5 shows a schematic structural diagram of another device for controlling laser emission according to some embodiments of the present disclosure. The device 500 may include a secondary emitting module 510, a primary emitting module 520, a processing module 530, and a control module 540.

The secondary emitting module 510 may be configured to emit a secondary emergent laser.

The primary emitting module 520 may be configured to emit a primary emergent laser.

The processing module 530 may be configured to generate a secondary control signal and transmit the secondary control signal to the control module 540, and may be also configured to obtain a primary control signal according to the secondary emergent laser emitted by the secondary emitting module 510 and a corresponding first detection echo, and send the primary control signal to the control module 540.

The control module 540 may be configured to control a transmission time and a transmission power of the secondary emitting module 510 and the primary emitting module 520; may be configured to receive the secondary control signal from the processing module 530, and send the secondary control signal to the secondary emitting module 510 at a first time, so that the secondary emitting module 510 may emit the secondary emergent laser; and also may be configured to receive the primary control signal from the processing module 530, and to send the primary control signal to the primary emitting module 520 at a second time, so that the primary emitting module 520 may emit the primary emergent laser;

In some embodiments, the foregoing device may further include the processing module 530. When the processing module 530 does not receive the first detection echo corresponding to the secondary emergent laser, the power of the primary emergent laser may be a preset power, and the primary control signal may be generated according to the preset power. When the processing module 530 receives the first detection echo corresponding to the secondary emergent laser, the power of the primary emergent laser may be an adjusted power, and the primary control signal may be generated according to the adjusted power. The adjusted power may be less than the preset power.

In some embodiments, the foregoing device may further include the processing module 530. When the processing module 530 receives the first detection echo corresponding to the secondary emergent laser, the processing module 530 may calculate the reflectivity of the detected object according to the secondary emergent laser and the first detection echo, obtain the adjusted power of the primary emergent laser according to the reflectivity, and generate the primary control signal according to the adjusted power.

In some embodiments, the foregoing device may further include the processing module 530 configured to calculate the reflectivity of the detected object. When the reflectivity is within a preset reflectivity range, the adjusted power may be obtained as a first power. The primary control signal may be generated according to the first power. When the reflectivity is not within the preset reflectivity range, the adjusted power may be determined to be a second power. The primary control signal may be generated according to the second power. The first power may be less than the second power.

In some embodiments, the foregoing device may further include the processing module 530. When the processing module 530 receives the first detection echo corresponding to the secondary emergent laser, the processing module 520 may calculate a distance of the detected object according to the secondary emergent laser and the first detection echo. The adjusted power of the primary emergent laser may be obtained according to the distance. The primary control signal may be generated according to the adjusted power.

In some embodiments, the foregoing device may further include the processing module 530 configured to calculate the distance of the detected object. When the distance is within the preset distance range, the adjusted power may be obtained as a third power. The primary control signal may be generated according to the third power. When the distance is not within the preset distance range, the adjusted power may be obtained as a fourth power. The primary control signal may be generated according to the fourth power.

In some embodiments of the present disclosure, the control module 540 may send the secondary control signal to the secondary emitting module 510 at the first time. The secondary emergent laser may be emitted first during the detection period. The processing module 530 may obtain the primary control signal according to a situation of the first detection echo and send the primary control signal to the control module 540. The control module 540 may send the primary control signal to the primary emitting module 520 at the second time. When the LiDAR detects an object in a secondary analysis region of the secondary emergent laser, energy of the primary emergent laser may be reduced, thereby avoiding a strong laser from irradiating human eyes and causing damage to the human eyes. Furthermore, by arranging the secondary emergent laser and the primary emergent laser in the detection period, a leading light of the secondary emergent laser can be effectively suppressed, thereby realizing a zero blind zone detection in a near field region. An emitting power of the primary emergent laser may be large enough to accurately detect a far field region. Each of the detection periods can measure a near field distance and a far field distance, thereby splicing a LiDAR ranging distance, and effectively detect a full range from the near field to the far field.

Figure 6:
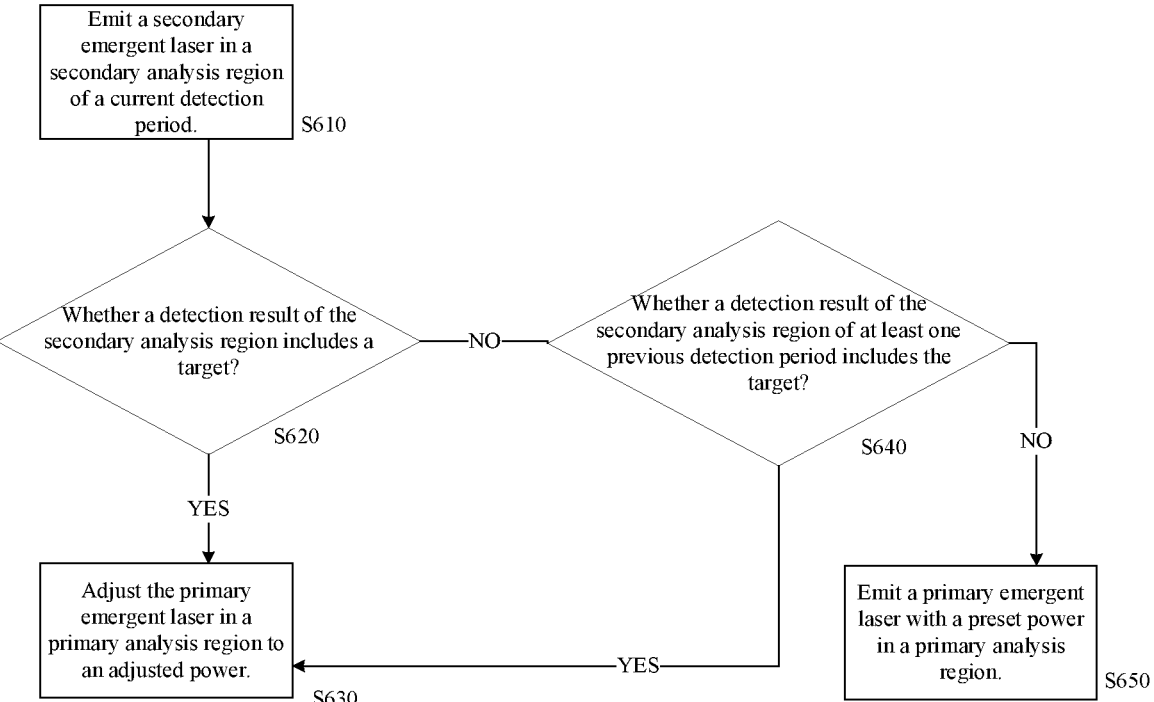
FIG. 6 shows a flowchart of a method for controlling LiDAR emission according to some embodiments of the present disclosure.

Due to a probability of missed detection in the secondary analysis region, if the detection result of the current secondary analysis region is inaccurate, but the power of the primary emergent laser emitted from the primary analysis region is adjusted correspondingly, this may result in a false emission of the primary emergent laser, bringing a serious eye safety problem. To improve the safety of the LiDAR and avoid false emission caused by the missed detection, the present disclosure may provide another method for controlling laser emission. FIG. 6 shows a flowchart of the method for controlling LiDAR emission according to some embodiments of the present disclosure. As shown in FIG. 6, the method may include the following steps:

Step 610: emitting a secondary emergent laser in a secondary analysis region of a current detection period.

Step 610 may be similar to step 110 as described above. The two detections may be completed in a detection period, i.e., a secondary analysis region and a primary analysis region. The secondary analysis region may include emitting a secondary emergent laser at a first time, receiving a corresponding first detection echo, and calculating a detection result according to the secondary emergent laser and the first detection echo. A power of the secondary emergent laser may be less than or equal to a safety threshold of human eyes. Because the power of the secondary emergent laser is small, a near field region can only be detected. The secondary emergent laser can meet the requirements of human eye safety in the near field region. The method for determining the power of the secondary emergent laser may be similar to the above embodiments, for simplicity, the descriptions of which are not repeated herein.

Step 620: determining whether a detection result of the secondary analysis region includes a target.

If the secondary analysis region includes a target, the method may proceed to S630 for adjusting a primary emergent laser in a primary analysis region to be an adjusted power. On the other hand, if the secondary analysis region does not include a target, the method may proceed to S640 for determining whether a detection result of the secondary analysis region of at least one previous detection period includes the target. If the at least one previous detection period includes the target, the method may proceed to S630 for emitting the primary emergent laser with the adjusted power in the primary analysis region. If the at least one previous detection period does not include the target, the method may proceed to S650 for adjusting the primary emergent laser in the primary analysis region to a preset power.

According to an emission time of the secondary emergent laser in the secondary analysis region and a reception time of the first detection echo, a traveling time can be obtained. A distance of a detected object (or a part of the detected object) can be obtained, which is the detection result of the secondary analysis region. The detected objects detected in the secondary analysis region can be the ground, a tree, a vehicle, a pedestrian, or the like. It may be determined whether a target is positioned in the near field region from the detection result in the secondary analysis region. It can be seen from the foregoing that the problem of human eye safety is more of a concern in the near field region. From the detection result of the secondary analysis region, it may be determined whether a distance of the detected object meets the distance requirements of the near field region. If the distance meets the distance requirements, the detection result of the secondary analysis region may be considered to include the target. If the distance does not meet the distance requirements, the detection result of the secondary analysis region may be considered to exclude the target.

The detection result of the secondary analysis region may include the target, indicating that the secondary analysis region detects an object in the near field region. A power of the primary emergent laser in the corresponding primary analysis region may be adjusted to the adjusted power. The detection result of the secondary analysis region may confirm that the object is positioned in the near field region. To avoid causing a human eye safety problem to a known object, the power of the primary emergent laser may be adjusted to the adjusted power, and the adjusted power can be 0, which means that the primary emergent laser is not emitted. Even if a type of the known object is not recognized, as long as a distance of the known object meets requirements of the near field region, the power of the primary emergent laser may be reduced. Through this way, the detection results of the secondary analysis region can be quickly responded for adjustment, thereby ensuring real-time and safety of the LiDAR. The method for determining the adjusted power may be similar to the foregoing embodiment, for ease of the description, which is not repeated here.

The detection result of the secondary analysis region does not include the target, indicating that the secondary analysis region does not detect the object in the near field region. For this scenario, it may be further determined whether the detection result of the secondary analysis region of a previous detection period includes the target. A determining process may be similar to the foregoing description. According to the transmission time and the reception time of the secondary analysis region of the previous detection period, the distance of the detected object may be obtained. It may be determined whether the distance requirements of the near field region are met to determine whether the detection result of the analysis region of the previous detection period includes the target.

The detection result of the secondary analysis region of the previous detection period includes the target, indicating that the detection result of the secondary analysis region of the previous detection period includes the target. The detection result of the secondary analysis region of the current detection period does not include the target. An "AND" operation may be performed for the two detection results, and it may be determined that the object is positioned in the near field region of the current detection period. Therefore, the power of the primary emergent laser may be reduced to the adjusted power, thereby avoiding causing a human eye safety problem to the object. The method for determining the adjusted power may be similar to the foregoing embodiment, for ease of the description, which is not repeated here.

The detection result of the secondary analysis region of the previous detection period does not include the target, indicating that the detection result of the secondary analysis region of the previous detection period does not include the target. The detection result of the secondary analysis region of the current detection period also does not include the target. An "AND" operation may be performed for the two detection results, and it may be determined that the object is not positioned in the near field region of the current detection period. Therefore, in the primary analysis region of the current detection period, the primary emergent laser with a preset power may be emitted, thereby effectively detecting the far field region and ensuring a ranging performance of the LiDAR. The method for determining the preset power may be similar to the foregoing embodiments, for ease of the description, which is not repeated here.

According to the foregoing embodiments, if the object is not detected in the secondary analysis zone in the near field region, the primary emergent laser with the preset power may be emitted in the next primary analysis region. However, a probability of missed detection may be positioned in the secondary analysis region. In order to further improve a confidence of a detection result of "the near field region does not include the target", when the detection result of the secondary analysis region of the current detection period does not include the target, the detection result of the secondary analysis region of the previous detection period may be further determined. Only when the detection results of the secondary analysis region of the current detection period and the secondary analysis region of the previous detection period both do not include the target, the detection result of "the near field region does not include the target" may be considered reliable. A cross-validation of detection results of two adjacent detection periods improves an accuracy of the detection result of the near field region in the secondary analysis region. Because whether the target is included in the near field region is the premise that the primary analysis region may emit the primary emergent laser with the preset power, the higher the accuracy of the detection result in the near field region, the less likely the LiDAR emits the high-power primary emergent laser by mistake, and the better the safety and reliability of the LiDAR.

To further improve the safety of the LiDAR, when the detection result of the secondary analysis region of the previous detection period does not include the target, the detection result of the secondary analysis region of the detection period before the previous detection period may be further acquired, and the detection result of the secondary analysis region of the current detection period may be combined with detection results of the secondary analysis region of previous two detection periods. The foregoing three detection results may be performed with an "AND" operation. As long as one of the detection results indicates "the near field region includes the target," it may be considered that the object is positioned in the near field region. To ensure the human eye safety, the primary emergent laser with high power cannot be emitted. Instead, the primary emergent laser may be reduced to the adjusted power. Only when three detection results all indicate "near field region does not include target," it may be considered that the object is not positioned in the near field region, and the primary emergent laser with the high power can then be emitted. The conditions for emitting the laser with high power are stricter and more cautious, thereby improving the safety and reliability of the LiDAR.

Through the same way, the detection result of the secondary analysis region of the current detection period and the detection result of the secondary analysis region of the previous N (N≥1, N is an integer) detection periods can be acquired. It may be determined according to the (N+1) detection results whether the near field region includes the target. Through this manner, it may be determined whether the primary emergent laser emitted from the primary analysis region of the current detection period may be a preset power which is larger or a reduced adjusted power.

Figure 7:
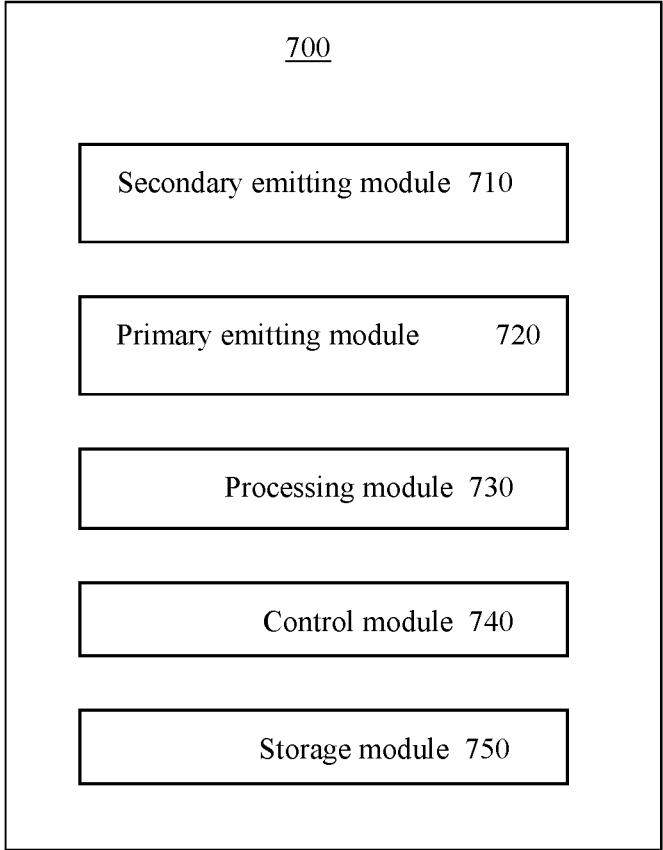
FIG. 7 shows a schematic structural diagram of a device for controlling laser emission according to some embodiments of the present disclosure.

FIG. 7 shows a schematic structural diagram of an embodiment of a device for controlling laser emission according to the present disclosure. The device 700 may include a secondary emitting module 710, a primary emitting module 720, a processing module 730, a control module 740, and a storage module 750.

The secondary emitting module 710 may be configured to emit a secondary emergent laser.

The primary emitting module 720 may be configured to emit a primary emergent laser.

The processing module 730 may be configured to generate a secondary control signal and send the secondary control signal to the control module 740. The processing module 730 may be also configured to obtain detection result according to the secondary emergent laser and a first detection echo and store the detection result in a storage module 750, e.g., in a time order. The time order may include an order the detection results are received. The processing module 730 may be also configured to determine whether a detection result of a secondary analysis region includes target. If the detection result includes the target, the processing module 730 may be configured for generating a primary control signal and sending the primary control signal to the control module 740. If not, the processing module 730 may be configured for acquiring the detection result of the secondary analysis region of at least one previous detection period from the storage module 750, determining whether the detection result of the secondary analysis region of the at least one previous detection period includes the target, and generating the primary control signal according to determining result and sending the primary control signal to the control module 740.

The control module 740 may be configured to control a transmission time and a transmission power of the secondary emitting module 710 and the primary emitting module 720. The control module 740 may be configured to receive the secondary control signal from the processing module 730 and send the secondary control signal to the secondary emitting module 710 at a first time, so that the secondary emitting module 710 may emit the secondary emergent laser. The control module 740 may also be configured to receive the primary control signal from the processing module 730 and send the primary control signal to the primary emitting module 720 at a second time, so that the primary emitting module 720 may emit the primary emergent laser.

The storage module 750 may be configured to receive the detection result of the secondary analysis region sent by the processing module 730 and store the detection result in a memory of the storage module 750 in the timing order.

In some embodiments, the foregoing device may further include the processing module 730 configured to determine whether the detection result of the secondary analysis region of at least one previous detection period includes the target. If the at least one previous detection period includes the target, a power of the primary emergent laser may be a preset power. The primary control signal may be generated according to the preset power. Otherwise, the power of the primary emergent laser may be an adjusted power, and the primary control signal may be generated according to the adjusted power.

To further improve a safety and a reliability of the LiDAR, and increase a confidence of a detection result of "the near field region does not include the target", when the processing module 730 determines that the detection result of the secondary analysis region of the current detection period includes the target, the processing module 730 may further acquire the detection result of the secondary analysis region of the at least one previous detection period from the storage module 750 and determine the detection result of the secondary analysis region of the at least one previous detection period. For the processing module 730, only when the detection results of the secondary analysis region of the current detection period and the secondary analysis region of the previous detection period both do not include the target, the detection result of "the near field region does not include the target" is considered reliable. The power of the primary emergent laser may be determined to be the preset power. The primary control signal may be generated according to the preset power and sent to the control module 740. A cross-validation of detection results of the two adjacent detection periods improves an accuracy of the detection result of the near field region in the secondary analysis region. Since whether the target is included in the near field region is the premise that the primary analysis region emits the primary emergent laser with the preset power, the higher the accuracy of the detection result in the near field region, the less likely the LiDAR emits the high-power primary emergent laser by mistake, and the better the safety and reliability of the LiDAR.

Some embodiments of the present disclosure also provide an LiDAR, including the devices 400, 500, or 700 for controlling the laser emission. The LiDAR can be any one of a solid-state LiDAR, a mechanical LiDAR, a hybrid solid-state LiDAR, a solid-state LiDAR, an OPA solid-state LiDAR, and the like. A specific working process of the devices 400, 500 or 700 may include the specific steps of the foregoing method for controlling the laser emission, which is not repeated here.

Further, based on the foregoing LiDAR, some embodiments of the present disclosure provide an automatic drive apparatus including the LiDAR in the foregoing embodiments. The automatic drive apparatus can be a car, an airplane, a boat, or other related apparatuses where the LiDAR may be used for intelligent sensing and detection. The automatic drive apparatus may include a drive apparatus body and the LiDAR in the foregoing embodiments. The LiDAR may be mounted on the automatic drive apparatus body.

The algorithms or displays provided here are not inherently related to any particular computer, virtual system or other equipment. Various general-purpose systems can also be used with the teaching based on this. Based on the foregoing description, the structure required to construct this type of system is obvious. In addition, the embodiments of the present disclosure are not directed to any specific programming language. It should be understood that various programming languages can be used to implement the content of the present disclosure described herein, and the foregoing description of a specific language is for the objective of disclosing the best embodiment of the present disclosure.

In the specification provided here, a lot of specific details are described. However, it can be understood that embodiments of the present disclosure can be practiced without these specific details. In some instances, common methods, structures, and technologies are not shown in detail, so as not to obscure the understanding of this specification.

Similarly, it should be understood that to streamline the present disclosure and help understand one or more of the various inventive aspects, in the foregoing description of the exemplary embodiments of the present disclosure, the various features of the embodiments of the present disclosure are sometimes grouped together into a single implementation, example, diagram, or description. However, the disclosed method should not be interpreted as reflecting the intention that the claimed invention requires more features than those explicitly stated in each claim.

The person skilled in the art can understand that it is possible to adaptively change the modules in an apparatus in the embodiment. The modules can be arranged in one or more devices different from the embodiment. The modules or units or assemblies in the embodiments can be combined into one module or unit or assembly. The modules or units or assemblies can be divided into a plurality of sub-modules or sub-units or sub-assemblies. Except that at least some of such features and/or processes or units are mutually exclusive, any combination can be configured to apply any combination to all features disclosed in this specification (including the accompanying claims, abstract and drawings) and all the processes or units of any method or the apparatus disclosed in this manner. Unless expressly stated otherwise, each feature disclosed in this specification (including the accompanying claims, abstract and drawings) can be replaced by an alternative feature that serves the same, equivalent or similar objective.

It should be noted that the foregoing embodiments illustrate rather than limit the present disclosure, and the person skilled in the art can design alternative embodiments without departing from the scope of the appended claims. In the claims, any reference signs positioned between parentheses should not be constructed as a limitation to the claims. The word "including" does not exclude the presence of elements or steps not listed in the claims. The word "a" or "an" in front of an element does not exclude the presence of a plurality of such elements. The invention can be implemented by means of hardware comprising a plurality of different elements and by means of a suitably programmed computer. In the unit claims enumerating a plurality of devices, a plurality of these devices can be embodied by the same hardware item. The use of the words "first, second, and third", etc. do not indicate any order. These words can be interpreted as names. Unless otherwise specified, the steps in the foregoing embodiments should not be understood as a limitation on an execution order.

What is claimed is:

1. A method for controlling laser emission, comprising:
emitting a secondary emergent laser at a first time of a detection period; and
adjusting a primary emergent laser emitted at a second time of the detection period according to a first detection echo corresponding to the secondary emergent laser,
wherein a time interval between the first time and the second time is greater than or equal to a traveling time of a longest detection distance corresponding to the secondary emergent laser.

2. The method according to claim 1, wherein a power of the secondary emergent laser is less than a power of the primary emergent laser.

3. The method according to claim 1, wherein the secondary emergent laser and the primary emergent laser are emitted within one cycle of the detection period.

4. The method according to claim 1, wherein adjusting the primary emergent laser emitted at the second time of the detection period according to the first detection echo corresponding to the secondary emergent laser comprises:
in response to the first detection echo corresponding to the secondary emergent laser being not received for a period of time, setting a power of the primary emergent laser emitted at the second time of the detection period to be a preset power; and
in response to the first detection echo corresponding to the secondary emergent laser being received, setting the power of the primary emergent laser emitted at the second time of the detection period to be an adjusted power, wherein the adjusted power is less than the preset power.

5. The method according to claim 4, wherein in response to the first detection echo corresponding to the secondary emergent laser being received, setting the power of the primary emergent laser emitted at the second time of the detection period to be the adjusted power comprises:
determining a reflectivity of a detected object according to the first detection echo; and
determining the adjusted power according to the reflectivity.

6. The method according to claim 5, wherein determining the adjusted power according to the reflectivity comprises:
in response to the reflectivity being within a preset reflectivity range, determining that a level of the adjusted power includes a first power; and
in response to the reflectivity being not within the preset reflectivity range, determining that the level of the adjusted power includes a second power, wherein the first power is less than the second power.

7. The method according to claim 4, wherein in response to the first detection echo corresponding to the secondary emergent laser being received, setting the power of the primary emergent laser emitted at the second time of the detection period to be the adjusted power comprises:

determining a distance of a detected object according to the first detection echo; and
determining the adjusted power according to the distance.

8. The method according to claim 7, wherein determining the adjusted power according to the distance comprises:
in response to the distance being within a preset distance range, determining that a level of the adjusted power includes a third power; and
in response to the distance being not within the preset distance range, determining that the level of the adjusted power includes a fourth power, wherein the third power is less than the fourth power.

9. A device for controlling laser emission, comprising:
a secondary emitting module, configured to emit a secondary emergent laser at a first time of a detection period; and
a primary emitting module, configured to adjust a primary emergent laser emitted at a second time of the detection period according to a first detection echo corresponding to the secondary emergent laser,
wherein a time interval between the first time and the second time is greater than or equal to a traveling time of a longest detection distance corresponding to the secondary emergent laser.

10. The device according to claim 9, wherein a power of the secondary emergent laser is smaller than a power of the primary emergent laser.

11. The device according to claim 9, wherein the secondary emergent laser and the primary emergent laser are emitted in one cycle of the detection period.

12. A LiDAR, comprising the device for controlling the laser emission according to claim 9.

13. An automatic drive apparatus, comprising a drive apparatus body and the LiDAR according to claim 12, wherein the LiDAR is mounted on the drive apparatus body.

14. A method for controlling laser emission, comprising:
emitting a secondary emergent laser in a secondary analysis region of a current detection period;
determining whether a detection result of the secondary analysis region includes a target; and
in response to determining that the detection result of the secondary analysis region includes the target, adjusting a primary emergent laser in a primary analysis region to be an adjusted power, the adjusted power being less than a preset power,
in response to determining that the detection result does not include the target, further determining whether a detection result of the secondary analysis region of at least one previous detection period includes the target;
in response to determining that the detection result of the at least one previous detection period does not include the target, emitting the primary emergent laser with the preset power in the primary analysis region; and
in response to determining that the detection result of the at least one previous detection period includes the target, adjusting the primary emergent laser in the primary analysis region to the adjusted power.

* * * * *